United States Patent

Numata et al.

[11] 3,960,982
[45] June 1, 1976

[54] THERMOSETTING RESINS

[75] Inventors: Shunichi Numata, Hitachi; Hitoshi Yokono, Katsuta; Junji Mukai, Hitachi; Tadashi Muroi, Kokubunji; Mineo Nakano; Mikio Manabe, both of Hitachi, all of Japan

[73] Assignees: Hitachi, Ltd.; Hitachi Chemical Company, Ltd., both of Japan

[22] Filed: June 18, 1974

[21] Appl. No.: 480,474

[30] Foreign Application Priority Data

June 21, 1973 Japan.................................. 48-70596

[52] U.S. Cl.............................. 260/838; 260/47 R; 260/49; 260/50; 260/51 R; 260/51.5; 260/52; 260/53 R; 260/55; 260/57 C; 260/58; 260/59 R; 428/524

[51] Int. Cl.²...................... C08L 61/34; C08L 61/08

[58] Field of Search................ 260/838, 47 R, 57 C

[56] References Cited
UNITED STATES PATENTS 3,316,140 4/1967 Sonnabend............................ 161/198

*Primary Examiner*—Wilbert J. Briggs, Sr.
*Attorney, Agent, or Firm*—Craig & Antonelli

[57] ABSTRACT

A thermosetting resin composition is derived from a modified novolak-type resin obtained by the reaction of a phenolic compound with an aralkyl halide or ether. The thermosetting resin is composed of 20 to 80 parts by weight of a thermosetting resin prepared by reacting a modified novolak-type resin represented by, for example, the general formula,

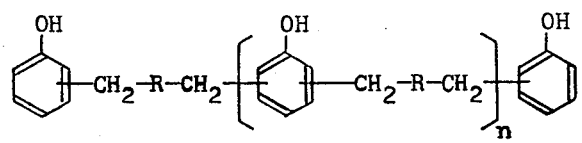

wherein R is an aromatic nucleus, with formaldehyde in the presence of a basic catalyst, and, in admixture therewith, 80 to 20 parts by weight of a thermosetting resin prepared by reacting the above-mentioned modified novolak-type resin with hexamethylenetetramine. The thermosetting resin is quickly curable and gives a cured article excellent in heat resistance.

9 Claims, 4 Drawing Figures

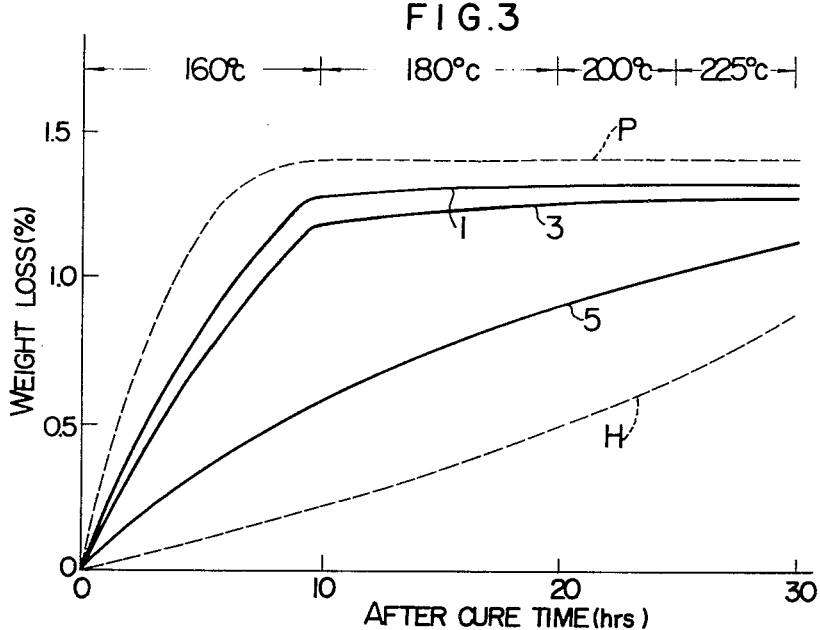
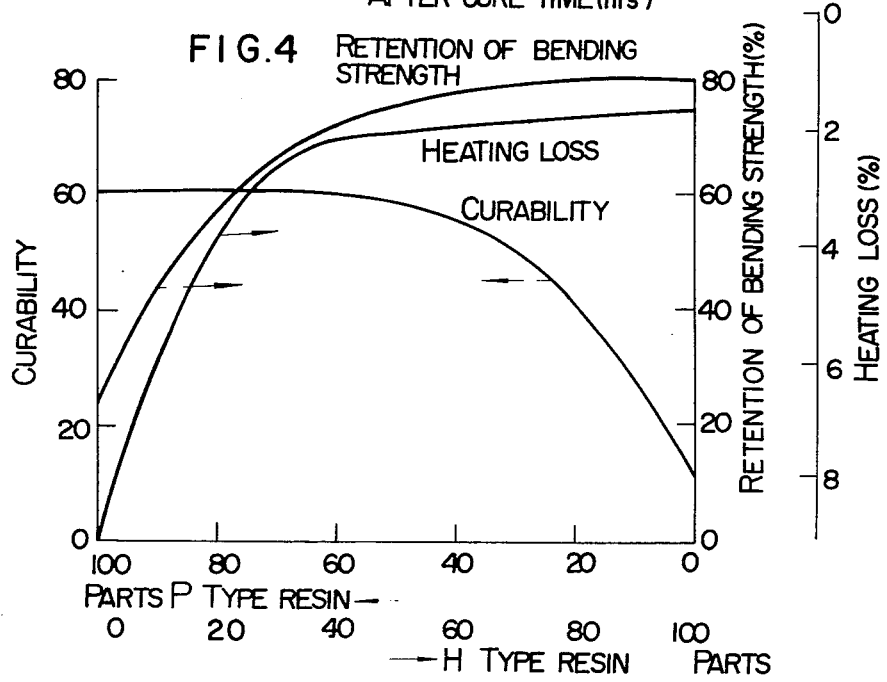

THERMOSETTING RESINS

BACKGROUND OF THE DISCLOSURE

Phenolic resins include novolak resins synthesized by reacting phenols with formaldehyde in the presence of an acid catalyst and resol resins synthesized by reacting phenols in the presence of a basic catalyst. It is well known that the former resins give cured articles on heating together with hexamethylenetetramine or the like curing agent, while the latter resins on heating by themselves.

On the other hand, thermosetting resins, like the above-mentioned phenolic resins, can be obtained by reacting modified novolak-type resins of the general formula,

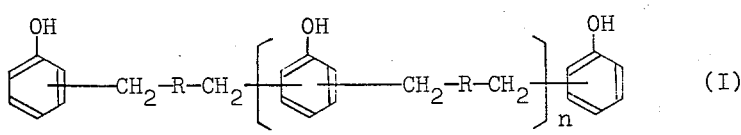

(I)

wherein R is phenyl, diphenyl, diphenyl ether, diphenyl methane, diphenyl ketone, diphenyl sulfone or naphthalene group or substituted groups thereof, with hexamethylenetetramine or with paraformaldehyde or the like formaldehyde source in the presence of a basic catalyst. Particularly, thermosetting resins obtained by blending modified novolak-type resins of the general formula (I) with hexamethylenetetramine (hereinafter referred to as "H-type resins") are excellent in heat resistance after curing but cannot give sufficiently cured articles unless heated at high temperatures (150° to 200°C) over long periods of time (more than 40 hrs.). Since the H-type resins are so low in curability (or hardenability) as mentioned above, they have such disadvantages that laminates thereof tend to form cracks or cause peeling of layers during after cure. In contrast thereto, thermosetting resins obtained by reacting the aforesaid modified novolak-type resins with paraformaldehyde or the like formaldehyde source in the presence of a basic catalyst (hereinafter referred to as "P-type resins") are far more excellent in curability (curable at about 180°C for 3 hours) than the above-mentioned H-type resins, but are undesirably low in heat resistance of cured articles.

SUMMARY OF THE INVENTION

An object of the present invention is to provide a thermosetting resin mixture composition having the excellent heat resistance of the aforesaid H-type resin and the quick curability of the aforesaid P-type resin.

BRIEF DESCRIPTION OF THE DRAWINGS

FIG. 3 shows the relation between after-cure time and weight loss of the laminate.

FIG. 4 shows the relation between blending ratio of H-type resin to P-type resin, curability of the resulting resin, and heat resistance (heating loss (weight loss on heating) and retention of bending strength) of a cured article obtained from said resin mixture composition.

DETAILED DESCRIPTION OF THE INVENTION

Figure 1:
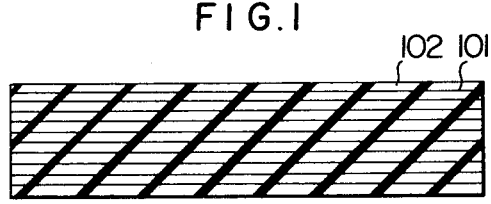
FIG. 1 is a cross-sectional view of a laminate prepared by use of the thermosetting resin mixture composition of the present invention.

This invention relates to a thermosetting resin mixture composition derived from a modified novolak-type resin obtained by the reaction of a phenolic compound with and aralkyl halide or ether.

More particularly, the invention is concerned with a thermosetting resin mixture composition comprising 20 to 80 parts, preferably 30 to 70 parts, by weight of a thermosetting resin (P-type resin) obtained by reacting a modified novolak-type resin, which is prepared by the reaction of a mono- or multi- valent phenolic compound having at least 2 active hydrogen atoms with an aralkyl ether or arkalkyl alcohol represented by the general formula R$(CH_2OR')_n$ or an aralkyl halide represented by the general formula R$(CH_2X)_n$, wherein R is a group selected from phenyl, diphenyl, diphenyl ether, diphenyl methane, diphenyl ketone, diphenyl sulfone and naphthalene groups and substituted groups thereof, R' is a hydrogen atom or an alkyl group having 1 to 4 carbon atoms, X is a halogen atom, and n is 2 to 3, with a formaldehyde source in the presence of a basic catalyst, and 80 to 20 parts, preferably 70 to 30 parts, by weight of a thermosetting resin (H-type resin) obtained by blending the above-mentioned novolak-type resin with hexamethylenetetramine.

In the above-mentioned H-type resin, the blending of the modified novolak-type resin with hexamethylenetetramine includes such two cases that the modified novolak-type resin is mixed with hexamethylenetetramine, and that the modified novolak-type resin is mixed with hexamethylenetetramine, and then the resulting mixture is reacted to such an extend that it can maintain a fusible or solvent-soluble state.

In most cases, a blend of two resins exhibits undesirable properties or average features of the two resins mixture composition. However, the thermosetting resin of the present invention has such characteristics that it displays desirable properties of the two resin components and is free from undesirable properties of the two.

The thermosetting resin mixture composition of the present invention is prepared in the following manner:

In the first place, 1.3 to 3 moles of a phenolic compound such as phenol, alkylphenol, chlorophenol, bromophenol, phenylphenol, hydroquinone, resorcinol, catechol, pyrogallon, bisphenol A or 4,4'-hydroxydiphenylsulfone is reacted with 1 mole of an aralkyl ether or alcohol of the formula R $(CH_2OR')_n$ or an aralkyl halide of the formula R $(CH_2X)_n$ in the presence or absence of an acid catalyst or a Friedel-Crafts catalyst, whereby the aforesaid modified novolak-type resin is obtained.

The molar ratio of the phenolic compound to the aralkyl ether or halide is preferably in the range from 1.3 to 2 moles to 1 mole in case n in the formula is 2, and from 2.5 to 3 moles to 1 mole in case n in the formula is 3. If the amount of the phenolic compound is less than 1.3 moles, the resulting mixture causes gelation, while if the amount of said compound is more than 3 moles, the resulting mixture gives a cured article degraded in heat resistance due to excess phenol. The phenolic compound used in the above is most preferably the so-called phenol. Further, in consideration of the reactivity with the phenolic compound and of the curability of the final resin, R in the formula representing the aralkyl ether or halide is preferably a phenyl or diphenyl ether group.

In the next place, the modified novolak-type resin obtained in the above is reacted with a formaldehyde source such as formaldehyde, paraformaldehyde, trioxane or polyoxymethylene in the presence of a basic catalyst such as sodium hydroxide, potassium hydroxide, lithium hydroxide, trimethylamine, triethylamine, dimethylamine, pyridine, dibenzylamine, ethylamine, diethylamine, di-n-propylamine or isopropylamine, whereby the P-type resin is obtained. The proportion of the formaldehyde source is preferably in the range of from 0.4 to 4 moles, in terms of formaldehyde, per mole of the phenol nucleus.

Further, the above-mentioned modified novolak-type resin is blended with 0.07 to 0.5 mole, per mole of the phenol nucleus, of hexamethylenetetramine, whereby the H-type resin is obtained.

The thus obtained P-type and H-type resins are mixed together in such proportions as 80 to 20 parts, preferably 70 to 30 parts, by weight of the former and 20 to 80 parts, preferably 30 to 70 parts, by weight of the latter, taking into consideration the curability of the resulting resin mixture and the heat resistance of the cured article obtained from the resin mixture, whereby the thermosetting resin of the present invention is obtained.

The thermosetting resin mixture composition of the present invention cures on heating at 160° to 180°C for 3 to 5 hours to give a cured article having such excellent heat resistance as to be usable, for example, at 200°C.

The present invention is illustrated in detail below with reference to examples.

Synthesis Example 1

Synthesis of H-type resin

A mixture comprising 400 g of phenol and 1 g of p-toluenesulfonic acid was heated to 110°C in a flask equipped with a stirrer, a thermometer, an injecting funnel and a reflux condenser. Into the mixture, 600 g of bis(methoxymethyl) diphenyl ether was dropped over a period of about 1 hour. During the dropping, methanol was by-produced but was removed out of the system. After the dropping, the mixture was allowed to stand at 110° to 120°C for 1 hour, and then heated to 150°C to remove formed by-products, whereby a modified novolak-type resin was obtained.

Subsequently, 200 g of the said modified novolak-type resin was dissolved in a mixed solvent comprising 100 g of toluene and 100 g of methyl ethyl ketone. To the resulting solution was added 20 g of hexamethylenetetramine, and the mixture was heated with stirring under reflux for 4 hours to obtain an H-type resin. The gelation time at 160°C of this H-type resin was about 120 seconds.

Synthesis Example 2

Synthesis of P-type resin

A solution, in 86 g of toluene, of 200 g of the modified novolak-type resin synthesized in Synthesis Example 1 was mixed with 4.7 g of triethylamine and 56 g of paraformaldehyde. The resulting mixture was heated under reflux for about 2 hours, and then concentrated to dryness at 50°C under 100 mmHg for 30 minutes. The concentrate was brought to a 50% solution in a 1 : 1 mixed solvent comprising toluene and methyl ethyl ketone to obtain a P-type resin solution. The gelation time at 160° C of this P-type resin was about 140 seconds.

Examples 1–5 and Comparative Examples 1–2

The H-type and P-type resins obtained in Synthesis Examples 1 and 2, respectively, were mixed together in such proportions as shown in Table 1 to prepare thermosetting resins.

Table 1

|  | H-Type resin (g) | P-Type resin (g) | Gelation time at 160°C(sec.) |
| --- | --- | --- | --- |
| Comparative Example 1 | 0 | 100 | 140 |
| Example 1 | 20 | 80 | 125 |
| " 2 | 40 | 60 | 108 |
| " 3 | 50 | 50 | 100 |
| " 4 | 60 | 40 | 102 |
| " 5 | 80 | 20 | 110 |
| Comparative Example 2 | 100 | 0 | 120 |

From Table 1, it is understood that the thermosetting resins of the present invention are not substantially different in gelation time at 160°C from each of the H-type and P-type resins. This suggests that at the time of handling and processing, the thermosetting resins of the present invention are not particularly distinguished from conventional resins.

Subsequently, glass cloths of 0.18 mm in thickness (WE-18G-104BX, produced by Nittoboseki Co. Ltd., Japan) were impregnated with each of the thermosetting resins, and then dried at 120°C for 10 minutes to prepare coated cloths. 30 Sheets of the coated cloths were laminated to one another and then pressed at 160°C for 1 hour under 40 kg/cm² to obtain such laminate of 5 mm in thickness as shown in FIG. 1, in which 101 represents the glass cloth and 102 the resin.

In order to examine the curability of each resin, the bending strength, and variation in bending strength, of the laminate were measured (at 180°C) at each stage after the laminate was successively aftercured at 160°C/10 hrs., 180°C/10 hrs., 200°C/5 hrs. and 225°C/5 hrs. Bending strength was measured according to JIS K 6911. Likewise, the weight loss at each said stage of the laminate was also measured (at room temperature) and employed as a standard for curability of the resin. The results obtained were as shown in FIGS. 2 and 3, respectively.

Figure 2:
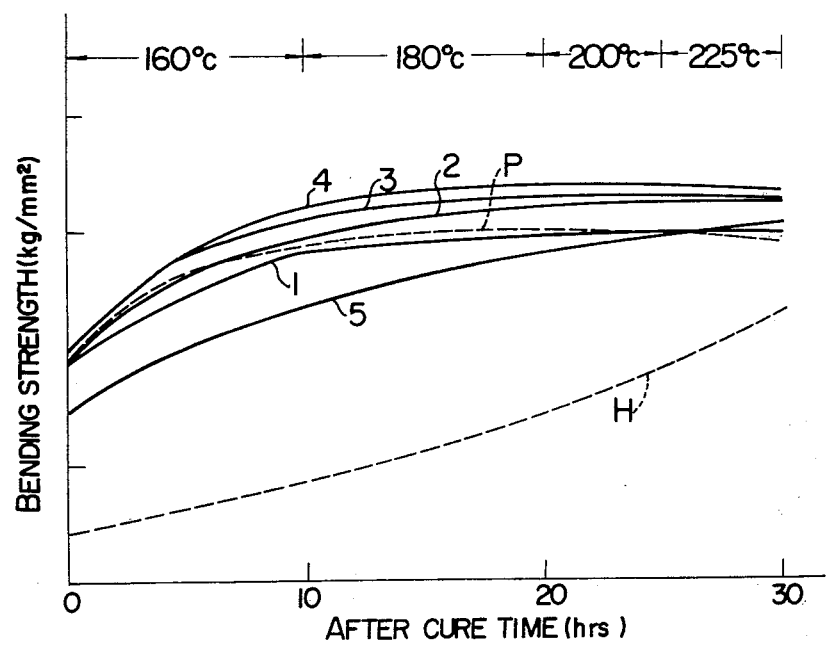
FIG. 2 shows the relation between after-cure time and bending strength of the laminate.

As is clear from FIGS. 2 and 3, the laminates 1 to 5, which were prepared from the thermosetting resins of Examples 1 to 5, do not substantially differ in bending strength and weight loss from the laminate P prepared from the P-type resin (Comparative Example 1). It is therefore understood that the thermosetting resins of the present invention are favorable in curability. What is to be particularly noted in FIG. 2 is that when aftercured at 160°C/10 hrs., the laminates 2 to 4 are rather higher in bending strength than the laminate P. This indicates that cured articles high in strength can be obtained by curing the thermosetting resins of the present invention at low temperatures for short periods of time.

Further, the above-mentioned laminates were individually aged at 240°C for 100 days, and then measured in retention of bending strength to initial value and in heating loss as standards for heat resistance of the laminates. The results obtained were as shown in Table 2 and FIG. 4.

Table 2

| | Bending strength at 180°C (kg/mm$^2$)*1 | | Retention of bending strength (%) | Heating loss *1 (%) |
| --- | --- | --- | --- | --- |
| | After after-curing | After aging at 240°C/ 100 days | | |
| Comparative Example 1 | 29 | 7 | 24.0 | 9.0 |
| Example 1 | 30 | 16 | 53.0 | 4.1 |
| " 2 | 32 | 22 | 68.8 | 2.2 |
| " 3 | 32 | 25 | 78.0 | 2.0 |
| " 4 | 33 | 25 | 75.8 | 1.9 |
| " 5 | 33 | 26 | 78.8 | 1.7 |
| Comparative Example 2 | 34 | 27 | 79.0 | 1.6 |

*1 Test piece, 5 × 10 × 100 mm

When it is assumed that a laminate prepared from a resin is substantially completely cured when after-cured under such conditions as 160°C/10 hrs. + 180°C/10 hrs. + 200°C/5 hrs. + 225°C/5 hrs. + 250°C/15 hrs., the curing rate, i.e. curability, of the said resin can be judged from the ratio between the bending strength of the laminate after said after-curing and the bending strength of the laminate immediately after press-molding. Based on the above-mentioned assumption, the laminates set forth in Table 2 were individually measured to obtain the ratio of (bending strength immediately after press-molding/bending strength after after-curing) × 100, and the obtained values were plotted in FIG. 4 against the proportions of the H-type and P-type resins constituting the thermosetting resins of the present invention to investigate variations in curability of the thermosetting resins.

As is clear from FIG. 4, the blending ratio of H-type to P-type resins which satisfies both curability and heat resistance desired to be attained by the present invention is preferably in the range of 30–70:70–30.

Synthesis Example 3

Synthesis of H-type resin

440 Grams of phenol was heated to 120°C in a flask equipped with a stirrer, a thermometer, an injecting funnel and a reflux condenser. Subsequently, 560 g of p-xylylene dichloride, divided into 6 portions, was intermittently added to the flask over a period of 1 hour. In this case, HCl gas was generated as a by-product but was removed out of the system. At the time when the generation of HCl was not substantially observed, the temperature was further elevated to 150°C to remove HCl sufficiently, whereby a modified novolak-type resin was obtained.

Subsequently, 250 g of said modified novolak-type resin was dissolved in 170 g of a 1 : 1 mixed solvent comprising toluene and methyl ethyl ketone. To the resulting solution was added 30 g of hexamethylenetetramine, and the mixture was heated under reflux for about 1 hour to obtain an H-type resin. The gelation time at 160°C of this H-type resin was 150 seconds.

Synthesis Example 4

Synthesis of P-type resin

A solution, in 167 g of toluene, of 250 g of the modified novolak-type resin obtained in Synthesis Example 3 was mixed with 5.3 g of triethylamine and 72 g of paraformaldehyde. The resulting mixture was reacted under reflux for 40 minutes, and then concentrated to dryness at 50°C under 100 mmHg to obtain a P-type resin. The gelation time at 160°C of this P-type resin was 110 seconds.

Examples 6-8 and Comparative Examples 3-4

The H-type and P-type resins obtained in Synthesis Examples 3 and 4, respectively, were individually diluted to 45% solutions with a 1 : 1 mixed solvent comprising toluene and methyl ethyl ketone. These solutions were mixed together in such proportions as shown in Table 3 to prepare a mixed resin solution.

Table 3

| | H-Type resin (g) | P-Type resin (g) |
| --- | --- | --- |
| Comparative Example 3 | 0 | 100 |
| Example 6 | 30 | 70 |
| " 7 | 50 | 50 |
| " 8 | 70 | 30 |
| Comparative Example 4 | 100 | 0 |

In the same manner as in Examples 1-5, glass cloths were impregnated with the above-mentioned mixed resin solution and dried to prepare coated cloths, which were then press-molded to obtain a laminate. In order to establish a standard for curability of the resin mixture, the laminate was measured (at 180°C) to obtain the ratio of bending strength immediately after press-molding under conditions of 160°C, 40 kg/cm$^2$ and 1 hour to bending strength after after-curing under conditions of 160°C/10 hrs. + 180°C/10 hrs. + 200°C/5 hrs. + 225°C/5 hrs. + 250°C/15 hrs. The results obtained were as set forth in Table 4, which shows that the greater the bending strength ratio, the more favorable the curability. Further, in order to establish a standard for heat resistance of the laminate, the laminate was aged at 240°C for 100 days, and then measured in retention of bending strength and in heating loss. The results obtained were as set forth in Table 5, which shows that the higher the retention of bending strength and the lower the heating loss, the more excellent the heat resistance.

Table 4

| | Bending strength at 180°C (kg/mm$^2$) | | (A/B) × 100 |
| --- | --- | --- | --- |
| | Before curing (A) | After curing (B) | |
| Comparative Example 3 | 21.5 | 29.0 | 74.1 |
| Example 6 | 20.5 | 30.0 | 68.3 |
| " 7 | 20.0 | 32.0 | 62.5 |
| " 8 | 18.5 | 32.0 | 57.8 |
| Comparative Example 4 | 12.3 | 34.0 | 36.2 |

Table 5

| | Bending strength at 180°C (kg/mm²) | | Retention of bending strength (%) | Heating loss (%) |
|---|---|---|---|---|
| | After after-curing | After aging at 240°C/100 days | | |
| Comparative Example 3 | 29.0 | 13.3 | 45.9 | 6.3 |
| Example 6 | 30.0 | 22.7 | 75.7 | 3.0 |
| " 7 | 32.0 | 26.0 | 81.3 | 2.2 |
| " 8 | 32.0 | 27.2 | 85.0 | 2.0 |
| Comparative Example 4 | 34.0 | 28.8 | 84.7 | 1.9 |

The results set forth in Tables 4 and 5 also show, like those in the foregoing examples, that the resin mixtures comprising the H-type and P-type resins are excellent both in curability and in heat resistance of molded articles obtained therefrom.

Examples 9-11 and Comparative Examples 5-6

A P-type resin prepared by forming the resin obtained in Synthesis Example 2 in a 70% acetone solution was mixed with an H-type resin prepared by reacting a 70% acetone solution of the modified novolak-type resin obtained in Synthesis Example 3 with hexamethylenetetramine under reflux for 1 hour. The resulting resin mixture was mixed with magnesium oxide as a curing promotor, 3 mm glass fiber as a filler, and zinc stearate as a releasing agent in such proportions as shown in Table 6. The mixing was conducted for 10 minutes by means of a kneader, and the mixture was dried at 120°C for 10 minutes to obtain a molding material.

Table 6

| | P-Type resin (g) | H-Type resin (g) | Magnesium oxide (g) | Glass fiber (g) | Zinc stearate (g) |
|---|---|---|---|---|---|
| Comparative Example 5 | 143 | 0 | 12 | 100 | 3 |
| Example 9 | 100 | 43 | " | " | " |
| " 10 | 71.5 | 71.5 | " | " | " |
| " 11 | 43 | 100 | " | " | " |
| Comparative Example 6 | 0 | 143 | " | " | " |

The molding material was molded at 160°C under 100 kg/cm² for 3 to 10 minutes by use of a compression molding machine, and the molded article (5 × 10 × 100 mm) was observed in appearance and measured in Barcol hardness. The results obtained were as set forth in Table 7.

Further, the molded article was after-cured at 160°C/5 hrs. + 180°C/5 hrs. + 200°C/15 hrs., aged at 140°C for 100 days, and then measured in retention of bending strength and in heating loss. The results obtained were as set forth in Table 8.

Table 7

| Curing time Sample | 3 minutes | | 5 minutes | | 7 minutes | | 10 minutes | |
|---|---|---|---|---|---|---|---|---|
| | Hardness | Appearance | Hardness | Appearance | Hardness | Appearance | Hardness | Appearance |
| Comparative Example 5 | 50 | Very good | 60 | Very good | 65 | Very good | 65 | Very good |
| Example 9 | 50 | " | 60 | " | 65 | " | 65 | " |
| Example 10 | 45 | " | 55 | " | 65 | " | 65 | " |
| Example 11 | 40 | " | 50 | " | 65 | " | 65 | " |
| Comparative Example 6 | 0 | Blister | 10 | Blister | 30 | Blister | 40 | " |

Table 8

| | Bending strength at 180°C (kg/mm²) | | Retention of bending strength(%) | Heating loss (%) |
|---|---|---|---|---|
| | After after-curing | After aging at 240°C/100 days | | |
| Comparative Example 5 | 9.3 | 2.3 | 24.7 | 15.0 |
| Example 9 | 9.9 | 6.8 | 68.7 | 6.7 |
| " 10 | 10.4 | 8.0 | 76.9 | 6.0 |
| " 11 | 10.7 | 8.9 | 83.2 | 5.3 |
| Comparative Example 6 | 11.1 | 9.4 | 84.7 | 4.0 |

As is clear from Tables 7 and 8, it is understood that when used also as a molding material, the resin mixture comprising the H-type and P-type resins is excellent in curability and gives a molded article excellent in heat resistance.

Synthesis Example 5

Synthesis of H-type resin

A mixture comprising 94 g of phenol and 206 g of p-octylphenol was heated to 120°C in the same flask as in Synthesis Example 1. Subsequently, 225 g of bis(-chloromethyl) naphthalene, divided into 6 portions, was intermittently added to the flask over a period of 1 hour. In this case, HCl gas was generated as a by-product but was removed out of the system. At the time when the generation of HCl was not substantially observed, the temperature was further elevated to 150°C to remove HCl sufficiently, whereby a modified novolak-type resin was obtained.

Subsequently, 450 g of the modified novolak-type resin was dissolved in 300 g of a 1 : 1 mixed solvent comprising toluene and methyl ethyl ketone. To the resulting solution was added 35 g of hexamethylenetetramine, and the mixture was reacted under reflux for about 1 hour to obtain an H-type resin. The gelation time at 160°C of this H-type resin was 180 seconds.

Examples 12-14 and Comparative Example 7

The H-type resin obtained in Synthesis Example 5 and the P-type resin obtained in Synthesis Example 2 were individually diluted to 45% solutions with a 1 : 1 mixed solvent comprising toluene and methyl ethyl ketone. These solutions were mixed together in such proportions as shown in Table 9 to prepare a mixed resin solution.

Table 9

|  | H-Type resin (g) | P-Type resin (g) |
|---|---|---|
| Example 12 | 30 | 70 |
| " 13 | 50 | 50 |
| " 14 | 70 | 30 |
| Comparative Example 7 | 100 | 0 |

In the same manner as in Examples 1-5, glass cloths were impregnated with the above-mentioned mixed resin solution and dried to prepare coated cloths, which were then press-molded to obtain a laminate. The curability of the resin mixture and the heat resistance of the laminate were as set forth in Table 10.

Table 10

|  | Bending strength at 180°C (kg/mm²) Before curing (A) | Bending strength at 180°C (kg/mm²) After curing (B) | (A/B) × 100 | Bending strength after aging at 240°C/100 days (kg/mm²) | Retention of bending strength (%) |
|---|---|---|---|---|---|
| Example 12 | 15.3 | 28.9 | 52.9 | 18.9 | 65.4 |
| " 13 | 14.1 | 27.6 | 51.1 | 19.5 | 70.7 |
| " 14 | 11.7 | 26.5 | 44.2 | 20.0 | 75.5 |
| Comparative Example 7 | 3.0 | 27.1 | 11.1 | 20.4 | 75.3 |

As is clear from Table 10, the resin mixtures comprising the H-type and P-type resins are excellent in curability and give cured articles excellent in heat resistance.

Synthesis Example 6

Synthesis of H-type resin

A mixture comprising 235 g of phenol and 0.5 g of p-toluenesulfonic acid was heated to 110°C in the same flask as in Synthesis Example 1. Into the mixture, 280 g of methoxymethyl-diphenyl ether (average number of functional groups: 2.5) was dropped over a period of about 1 hour. During the dropping, methanol was by-produced but was removed out of the system. After the dropping, the mixture was maintained at 110°-120°C for 1 hour, and then heated to 150°C to remove methanol sufficiently, whereby a modified novolak-type resin was obtained.

Subsequently, 430 g of the above-mentioned modified novolak-type resin was dissolved in a mixed solvent comprising 130 g of toluene and 130 g of methyl ethyl ketone. To the resulting solution was added 58 g of hexamethylenetetramine, and the mixture was heated under reflux for 2.5 hours to obtain an H-type resin. The gelation time at 160°C of this H-type resin was 120 seconds.

Example 15-17 and Comparative Example 8

The H-type resin obtained in Synthesis Example 6 and the P-type resin obtained in Synthesis Example 2 were individually diluted to 45% solutions with a 1 : 1 mixed solvent comprising toluene and methyl ethyl ketone. These solutions were mixed together in such proportions as shown in Table 11 to prepare a mixed resin solution.

Table II

|  | H-Type resin (g) | P-Type resin (g) |
|---|---|---|
| Example 15 | 30 | 70 |
| " 16 | 50 | 50 |
| " 17 | 70 | 30 |
| Comparative Example 8 | 100 | 0 |

In the same manner as in Examples 1-5, glass cloths were impregnated with the above-mentioned mixed resin solution and dried to prepare coated cloths, which were then press-molded to obtain a laminate. The curability of the resin mixture and the heat resistance in terms of bending strength of the laminate were set forth in Table 12.

Table 12

|  | Bending strength at 180°C (kg/mm²) Before curing (A) | Bending strength at 180°C (kg/mm²) After curing (B) | (A/B) × 100 | Bending strength after aging at 240°C/100 days (kg/mm²) | Retention of bending strength (%) |
|---|---|---|---|---|---|
| Example 15 | 20.2 | 29.8 | 67.8 | 16.7 | 56.0 |
| " 16 | 19.6 | 31.4 | 62.4 | 23.8 | 75.8 |
| " 17 | 17.7 | 32.8 | 54.0 | 25.0 | 76.2 |
| Comparative Example 8 | 6.0 | 33.3 | 18.0 | 26.1 | 78.4 |

As detailed in the above, the thermosetting resins of the present invention give useful cured articles, which cannot be obtained by use of conventional resins. The resins of the present invention and cured products thereof are useful chiefly as electric insulating materials, and are particularly preferable as molding materials, laminating materials and adhesives.

What is claimed is:

1. A thermosetting resin mixture composition which comprises a first thermosetting resin prepared by reacting with a formaldehyde source selected from the group consisting of formaldehyde, paraformaldehyde, trioxane, and polyoxymethylene in the presence of a basic catalyst a modified novolak-type resin obtained by reacting a mono or multi-valent phenolic compound having at least two active hydrogen atoms with an aralkyl ether or alcohol represented by the general formula R(CH$_2$OR')$_n$ or an aralkyl halide represented by the general formula R(CH$_2$X)$_n$, wherein R is a group selected from phenyl, diphenyl, diphenyl ether, diphenyl methane, diphenyl ketone, diphenyl sulfone and naphthalene groups and substituted groups thereof, R' is a hydrogen atom or an alkyl group having 1 to 4 carbon atoms, X is a halogen atom, and n is 2 to 3, and a second thermosetting resin prepared by blending the above-mentioned modified novolak-type resin with hexamethylenetetramine, the amount of said first resin being 20 to 80 parts by weight, and the amount of said second resin being 80 to 20 parts by weight.

2. A thermosetting resin mixture composition which comprises a first thermosetting resin prepared by reacting with a formaldehyde source selected from the group consisting of formaldehyde, paraformaldehyde, trioxane, and polyoxymethylene in the presence of a basic catalyst a modified novolak-type resin obtained by reacting 1.3 to 3 moles of a mono- or multi- valent phenolic compound having at least two active hydrogen atoms with 1 mole of an aralkyl ether or alcohol represented by the general formula R(CH$_2$OR')$_n$ or 1 mole of an aralkyl halide represented by the general formula R(CH$_2$X)$_n$, wherein R is a group selected from phenyl, diphenyl, diphenyl ether, diphenyl methane, diphenyl ketone, diphenyl sulfone and naphthalene groups and substituted groups thereof, R' is a hydrogen atom or an alkyl group having 1 to 4 carbon atoms, X is a halogen atom, and n is 2 to 3, and a second thermosetting resin prepared by blending the above-mentioned modified novolak-type resin with hexamethylenetetramine, the amount of said first resin being 30 to 70 parts by weight, and the amount of said second resin being 70 to 30 parts by weight.

3. A thermosetting resin mixture composition which comprises a first thermosetting resin prepared by reacting with a formaldehyde source selected from the group consisting of formaldehyde, paraformaldehyde, trioxane, and polyoxymethylene in the presence of a basic catalyst a modified novolak-type resin obtained by reacting 1.3 to 3 moles of phenol with 1 mole of an aralkyl ether or alcohol represented by the general formula R(CH$_2$OR')$_n$ or 1 mole of an aralkyl halide represented by the general formula R(CH$_2$X)$_n$, wherein R is a group selected from phenyl, diphenyl, diphenyl ether, diphenyl methane, diphenyl ketone, diphenyl sulfone and naphthalene groups and substituted groups thereof, R' is a hydrogen atom or an alkyl group having 1 to 4 carbon atoms, X is a halogen atom, and n is 2 to 3, and a second thermosetting resin prepared by blending the above-mentioned modified novolak-type resin with hexamethylenetetramine, the amount of said first resin being 30 to 70 parts by weight, and the amount of said second resin being 70 to 30 parts by weight.

4. A resinous molding material comprising a filler, a releasing agent and the thermosetting resin mixture composition as claimed in claim 1.

5. A resinous molding material comprising a filler, a releasing agent and the thermosetting resin mixture composition as claimed in claim 2.

6. A resinous molding material comprising a filler, a releasing agent and the thermosetting resin mixture composition as claimed in claim 3.

7. A thermosetting resin mixture composition according to claim 1, wherein said modified novolak-type resin is obtained by reacting 1.3 to 3 moles of a phenolic compound selected from the group consisting of phenol, alkylphenol, chlorophenol, bromophenol, phenylphenol, hydroquinone, resorcinol, catechol, pyrogallol, bisphenol A and 4,4'-hydroxydiphenyl sulfone with 1 mole of the aralkyl ether, alcohol or halide.

8. A thermosetting resin mixture composition according to claim 1, wherein the proportion of the formaldehyde source is in the range of from 0.4 to 4 moles, in terms of formaldehyde, per mole of the phenol nucleus of said phenolic compound, and the modified novolak-type resin is blended with 0.07 to 0.5 mole; per mole of the phenol nucleus, of hexamethylenetetramine.

9. A thermosetting resin mixture composition to claim 3, wherein the modified novolak-type resin is obtained by reacting 1.3 to 2 moles of phenol with 1 mole of an aralkyl ether or alcohol represented by the general formula R(CH$_2$OR')$_2$ or 1 mole of an alkyl halide represented by the general formula R(CH$_2$X)$_2$, wherein R is a phenyl or diphenyl ether group, and R' is a hydrogen atom or an alkyl group having 1 to 4 carbon atoms.

* * * * *